(12) United States Patent
Callum (10) Patent No.: US 7,370,111 B2
(45) Date of Patent: May 6, 2008

(54) SYSTEM, PROTOCOL AND RELATED METHODS FOR PROVIDING SECURE MANAGEABILITY

(75) Inventor: Roy Callum, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 990 days.

(21) Appl. No.: 10/113,812

(22) Filed: Mar. 27, 2002

(65) Prior Publication Data

US 2003/0187999 A1 Oct. 2, 2003

(51) Int. Cl.
G06F 15/16 (2006.01)
(52) U.S. Cl. .............. 709/229; 709/230; 713/171; 713/183; 380/260
(58) Field of Classification Search .......... 709/229
See application file for complete search history.

(56) References Cited

U.S. PATENT DOCUMENTS

| | | | |
|---|---|---|---|
| 5,001,755 A | 3/1991 | Skret | |
| 5,241,599 A * | 8/1993 | Bellovin et al. ............ | 713/171 |
| 5,337,313 A | 8/1994 | Buchholz et al. | |
| 5,646,996 A | 7/1997 | Latka | |
| 6,247,059 B1 | 6/2001 | Johnson et al. | |
| 6,301,681 B1 | 10/2001 | Chen et al. | |
| 6,339,796 B1 * | 1/2002 | Gambino .................... | 709/248 |
| 6,466,800 B1 | 10/2002 | Sydon et al. | |
| 6,487,176 B1 | 11/2002 | Lehmann | |
| 6,502,135 B1 | 12/2002 | Munger et al. | |
| 6,697,857 B1 | 2/2004 | Dixon et al. | |
| 6,810,259 B1 | 10/2004 | Zhang | |
| 2001/0020275 A1 | 9/2001 | Jari et al. | |
| 2001/0052072 A1 | 12/2001 | Jung | |
| 2002/0052200 A1 * | 5/2002 | Arkko et al. ............... | 455/432 |
| 2003/0002676 A1 * | 1/2003 | Stachura et al. ........... | 380/260 |
| 2003/0093680 A1 * | 5/2003 | Astley et al. ............... | 713/183 |
| 2003/0206559 A1 | 11/2003 | Trachewsky et al. | |

OTHER PUBLICATIONS

"RFC 2402—IP Authentication Header", Internet Working Group, 1998.*
"U.S. Appl. No. 09/895,788 Final Office Action Mailed Mar. 16, 2007".
"U.S. Appl. No. 09/895,788 Final Office Action Mailed Apr. 11, 2006".
"U.S. Appl. No. 09/895,788 Final Office Action Mailed Apr. 14, 2005".
"U.S. Appl. No. 09/895,788 Office Action Mailed Oct. 2, 2006".
"U.S. Appl. No. 09/895,788 Office Action Mailed Nov. 2, 2004".
"U.S. Appl. No. 09/895,788 Office Action Mailed Sep. 29, 2005".
Kent, S. , "IP Authentication Header", (Nov. 1998),1-22.

(Continued)

*Primary Examiner*—Yves Dalencourt
(74) *Attorney, Agent, or Firm*—Blakely, Sokoloff, Taylor & Zafman LLP (57) ABSTRACT

A system, protocol and related methods for providing secure manageability are generally described. In this regard, a communication protocol is introduced comprising an authentication protocol, responsive to an initialization event in a host device, to authenticate a remote device and establish an initial anti-replay value, and a secure communication protocol, selectively invoked upon authentication of the remote device, to facilitate subsequent communications between at least the host device and the authenticated remote device utilizing the initial anti-replay value in at least a first of said subsequent communications.

45 Claims, 4 Drawing Sheets

OTHER PUBLICATIONS

Kent, S., "IP Authentication Header", (Dec. 2005),1-35.
Kent, S., "IP Encapsulating Security Payload (ESP)", (Dec. 2005),1-44.
Kent, S., "IP Encapsulating Security Payload (ESP)", (Nov. 1998),1-22.
Kent, S., "Security Architecture for the Internet Protocol", (Dec. 2005),1-101.
Kent, S., "Securtiy Architecture for the Internet Protocol", (Nov. 1998),1-66.
Matthew Rollender, "IPSec Security and the Corporate Enterprise". Retrieved from the Internet at: http://developer.intel.com/update/archive/issue20/stories/top20.htm. Retrieved on Oct. 10, 2001. pp. 1-3.
IPSec, White Paper, Cisco Systems. pp. 1-10, 1998.

* cited by examiner

SYSTEM, PROTOCOL AND RELATED METHODS FOR PROVIDING SECURE MANAGEABILITY

TECHNICAL FIELD

The present invention generally relates to the field of data networks and, more particularly, to a system, protocol and related methods for providing secure manageability.

BACKGROUND

Networking of computing devices is known. Examples of such data networks include local area networks (LANS), wide area networks (WANS), global networks (Internet), the networking of telecommunications devices (i.e., cellular networks, PCS networks, wireline telephony networks), and the like. Many of these networks comprise a variety of client computers with disparate processor architectures and Operating Systems (OS) that rely on architecture dependent versions of standardized network communication protocols such as, for example the well-known Transmission Control Protocol/Internet Protocol (TCP/IP), Internetwork Packet exchange (IPX), User Datagram Protocol/Internet Protocol (UDP/IP), or other suitable networking protocols (cumulatively referred to as the Internet communication suite) to enable these otherwise disparate computing architectures to interact with one another.

Producers and consumers of computing devices and, more particularly, networks of computing devices have begun to quantify the costs associated with the purchase and on-going maintenance of these systems and networks. One generalization drawn from such study is that the initial cost of purchasing a computing device and its associated application software is often relatively small compared to the cost of maintaining such systems and networks. That is to say, the cost of system management, lost productivity due to computer/network downtime and the like are significantly higher than the initial cost of purchasing the hardware and software elements comprising the network.

Accordingly, it is not surprising that managers of data networks (e.g., information technology (IT) departments, etc.) are placing more pressure on the manufacturers of computing devices to improve the manageability of such computing devices in an effort to drive down the cost associated with the management and maintenance associated with computing and networking devices, i.e., to reduce the total cost of ownership (TCO) associated with the maintenance of the devices and the networks. Manageability, in this instance, is the ability to remotely control and manage at least a subset of the hardware functions of a remote computing device (e.g., a client computer).

In this regard, a number of network management tools have been introduced. Typically, such conventional network management tools enable IT personnel to monitor the state of a remote computing device. In certain instances, the conventional network management tools facilitate remote diagnostics of certain failure modes of a computing device. While the introduction of such conventional tools has served to improve the general state of network management, fundamental limitations in their effectiveness remain.

An example of one such inherent limitation in conventional management tools is the fact that they rely on an operational operating system (OS) at the remote computing device. That is, many of such conventional management tools require an operating client-side application, executing atop the OS of the computing device. If the OS hangs so, too, does the ability to access and utilize the resources of the client-side component of the conventional network management tool.

Another limitation often associated with such conventional network management tools is the lack of a secure communications interface between the monitoring and monitored computing devices. That is, conventional management tools often merely rely on the security measures associated with the operating system to ensure the secure nature of the network management communications. At the network level (e.g., of the well-known Open Systems Interconnect (OSI) communication model), many operating systems utilize the Secured Internet Protocol (IPSec) developed within the Internet Engineering Task Force (IETF) (i.e., IETF Request for Comment (RFC) 2401 *Security Architecture for the Internet Protocol* (1998)), which embeds security information in each communication packet.

One element of the IPSec security information is an anti-replay value, often implemented as a sequence number of a packet within a communication stream, to repel replay attacks on the secure communication by a third-party. As a packet sequence number, the anti-replay value changes on a per-packet basis. Conventional implementations often require each of the communicating entities to continuously store updated version(s) of the anti-replay value upon receipt of each packet. The updated sequence value is often stored on a hard-drive of the client and, in this regard, typically requires an functional operating system in order to access the last sequence number and recover from the initialization event. Those skilled in the art will appreciate, however, that a functional operating system is not always available after such an initialization event.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

The present invention is generally directed to a system, protocol and related methods for providing secure manageability of a computing device over a data network. In this regard, an enhanced network interface (ENI) is presented which employs an innovative authentication protocol with anti-replay features, to authenticate a remote device upon detecting an initialization event in a host device, facilitating recovery and re-establishment of secure communications with an authenticated remote device (e.g., manageability server). Those skilled in the art will appreciate, from the description to follow, that the protocol enabled by the enhanced network interface facilitates such authentication of a manageability server, for example, even in the absence of a functional operating system executing on the host device. Unlike conventional implementations, use of the innovative authentication protocol enables the ENI to authenticate and establish secure communications with a remote network device even in the absence of a functional operating system executing on the host device.

As used herein, the innovative protocol used to authenticate a remote network device is colloquially referred to as the Anti-Replay Exchange (ARE) protocol. Those skilled in the art will appreciate from the discussion to follow that the ARE is selectively employed between an ENI and a remote network device (e.g., manageability server) to authenticate the remote device to the ENI. Once authenticated, conventional secure communication methods and/or protocols may well be employed between the ENI and the authenticated remote device to facilitate secure communications (e.g., manageability communications). In this regard, the ARE introduced herein is one layer of a multi-layer communication protocol employed to facilitate secure, manageability communications between authenticated devices.

The enhanced network interface (ENI) is typically implemented in a computing device to be managed (or, client computing device), while the manageability services are implemented in a computing device providing the management interface (or, manageability computing device). It should be appreciated from the discussion to follow that either computing device may well be beneficially endowed with one or both of the ENI and/or the manageability services and may, in this regard, be a client computing device at one time and a manageability computing device at another.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

EXAMPLE SECURE MANAGEABILITY SYSTEM

Figure 1:
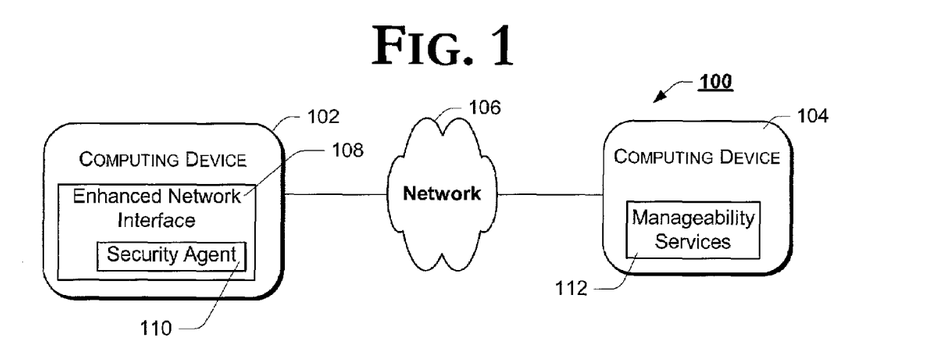
FIG. 1 is a block diagram of an example network incorporating the teachings of the present invention, according to one example implementation of the present invention.

FIG. 1 provides a block diagram of an example network (e.g., a data network) incorporating the teachings of the present invention. In accordance with the illustrated example embodiment of FIG. 1, network 100 is depicted comprising a computing device 102 coupled to another (remote) computing device 104 through one or more networking devices comprising a networking architecture 106. In accordance with one aspect of the present invention, computing device 102 includes an enhanced network interface (ENI) 108 endowed with a security agent 110 to authenticate a remote computing device 104 (e.g., a manageability server), and secure at least manageability communications with the manageability services 112 executing on the remote computing device 104. In this regard, a secure manageability system is established comprising a computing device (104) endowed with an innovative ENI 108 coupled with the manageability service(s) 112 of a remote computing device 104 through a data network 106.

As will be developed more fully below, the security agent 110 of the ENI is selectively invoked upon receipt of an initialization event of the client computing device 102 ("client"). As will be developed more fully below, security agent 110 authenticates a remote computing device as a manageability server in order to establish a secure communication link with the remote manageability computing device to secure at least manageability communications between the ENI 108 and the manageability services 112 of the computing device(s), e.g., 104. As used herein, an initialization event may be a power-on ("cold") boot of a host computing device, a reset (warm boot) of a host computing device, a reset of a processor within the computing device, and the like.

In accordance with one aspect of the present invention, security agent 110 is endowed with an authentication protocol, colloquially referred to as the anti-replay exchange (ARE) communication protocol. As developed more fully below, an example implementation of the ARE protocol includes one or more of a request (REQ), response (RSP), verify/challenge (VFY) and/or authentication (AUTH) feature(s). Utilizing the ARE protocol, ENI 108 identifies and authenticates a remote computing device, also employing at least a subset of the ARE protocol features, whereupon the remote computing device provides ENI 108 with a baseline anti-replay value for use as a starting point for securing subsequent communications with the remote computing device using, e.g., IPSec. In accordance with alternate implementations, the resources of the ARE protocol may well be integrated within an enhanced version of IPSec, to facilitate the establishment and exchange of a baseline anti-replay value with an authenticated remote computing device to facilitate at least manageability communications with the remote computing device.

Once security agent 110 has authenticated a remote computing device and established a baseline anti-replay value, security agent 110 selectively invokes an instance of security communication services, which employs a secured communication protocol for use in at least manageability communications between the computing devices. According to one example implementation, the communication services element of security agent 110 employs the IPSec communications protocol to facilitate at least subsequent manageability communications between the ENI 108 and the manageability services 112 of the remote computing device (e.g., 104) via data network 106 until a subsequent initialization event is encountered.

Upon receiving an indication of a subsequent initialization event at the host (102), the ENI 108 again invokes the resources of security agent 110 to identify and authenticate a remote computing device employing the innovative ARE protocol to re-establish secure communications with the manageability services 112. In this regard, the ARE protocol is an enabling technology that authenticates a remote computing device as a legitimate source of manageability services and establishes a baseline anti-replay value in support of subsequent manageability communications using, for example, the security resources of IPSec.

In accordance with the illustrated example implementation, the ARE protocol is implemented within security agent 110 of ENI 108 and, in this regard, functions as described herein, even in the absence of an operational OS executing on the host computing device 102.

According to one example implementation, computing device 102 includes key exchange/management features (not particularly denoted), which establish and maintain a "shared secret" between the computing device 102 and computing device 104. In this regard, any of a number of secure key exchange management protocol(s) such as, e.g., the Internet Security Association Key Management Protocol (ISAKMP) (IETF RFC2408 (1998)), Oakley Key Distribution Protocol (OKDP), and the like may well be used. According to another implementation, the security key (SS) is provided to computing device 102 manually, e.g., by carrying the security key to the client 102 on a removable storage media (floppy disk, CD-ROM, and the like) and installing it using a user interface. Once the security key is established by the host computing device 102, it is also provided to and stored locally within ENI 108 as well.

As introduced above, one or more remote computing device(s) such as, e.g., computing device 104, includes manageability services 112. As used herein, manageability services 112 comprise one or more applications (tools) that monitor, diagnose and/or manage one or more aspects of a communicatively coupled, e.g., through network 106, computing device(s). In accordance with the illustrated example implementation, manageability services 112, and/or the computing device 104, include ARE protocol communication resources with which to enable the authentication features described herein.

But for the introduction of the innovative ARE protocol resources, manageability service(s) 112 and computing device 104 are intended to represent any of a wide variety of manageability service(s) and computing device(s) known in the art and, as such, need not be further developed herein.

Similarly, data network 106 is intended to represent any of a wide variety of circuit and/or packet-switched networks known in the art. In this regard, network 106 may well be a local area network (LAN), a wide area network (WAN), a global inter-networking of multiple networks (e.g., Internet), a communications network, and the like adhering to any of a number of network architecture(s).

Those skilled in the art will appreciate, given the foregoing introduction, that the enhanced network interface 108 facilitates true manageability services, i.e., without the need of an operational OS executing on the managed client computer. Moreover, the addition of the innovative security agent 112 and the associated anti-replay exchange (ARE) protocol facilitate authentication of a remote computing device supporting establishment of secure manageability communications between the enhanced network interface 108 and the one or more manageability computing device(s) (e.g., 104).

EXAMPLE INTERFACE AND ASSOCIATED COMMUNICATION PROTOCOL(s)

Having introduced the various elements of the secure manageability system above, the disparate elements of the system will be developed in further detail with reference to FIGS. 2-6. For ease of illustration in providing context, and not limitation, the description of FIGS. 2-6 will be presented with continued reference to FIG. 1.

Figure 2:
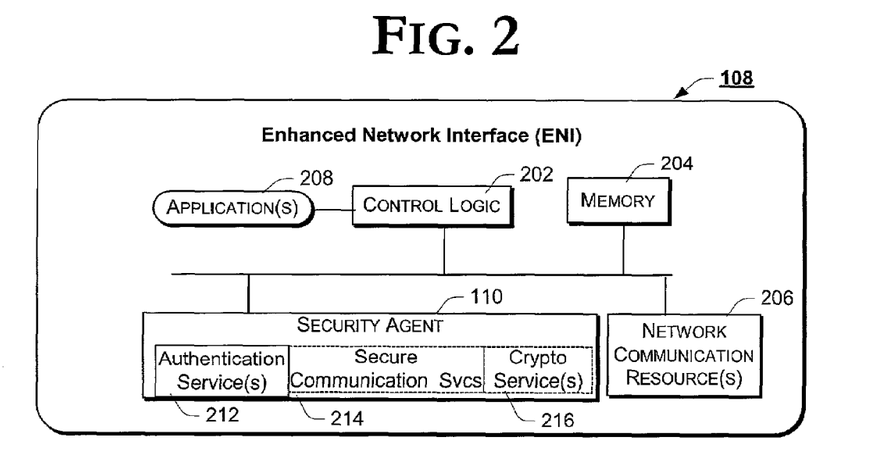
FIG. 2 is a block diagram of an example enhanced network interface incorporating a secure communications interface, in accordance with one aspect of the present invention.

FIG. 2 illustrates a block diagram of an example enhanced network interface (ENI) incorporating the teachings of the present invention. In accordance with the illustrated example implementation of FIG. 2, ENI 108 is depicted comprising control logic 202, memory 204, network communication resource(s) 206, security agent 110 and, optionally, one or more application(s) 208, each logically coupled as depicted. In accordance with one aspect of the present invention, to be developed more filly below, ENI 108 includes a security agent 110 comprising one or more of authentication services 212, secure communication services 214, and/or cryptography service(s) 216. It is to be appreciated that, although depicted as a number of disparate functional blocks, one or more of elements 202-216 may well be combined into one or more multi-functional blocks. Similarly, security agent 110 may well be practiced with fewer functional blocks, i.e., with only authentication services 212, without deviating from the spirit and scope of the present invention. In this regard, ENI 108 in general, and security agent 110 in particular, are merely illustrative of one example implementation of one aspect of the present invention.

As introduced above, ENI 108 facilitates the identification, authentication and establishment of manageability communication resources with a remote computing device, with or without the need of a functional OS executing on a host computing device. Thus, in accordance with one example implementation, one or more features of security agent 110 may well be implemented in hardware in the ENI 108. In accordance with one example implementation, enhanced network interface 108 is a network interface device (e.g., a network interface card (NIC)), and the one or more aspects of security agent 110 are implemented in an application specific integrated circuit (ASIC) provisioned on/within the network interface device. According to one example implementation, the one or more elements of security agent 110 are implemented within a media access controller (MAC) of ENI 108. Those skilled in the art will appreciate, however, that in alternate embodiments one or more of the features of enhanced network interface 108 may well be implemented as executable content, e.g., software, firmware, etc.

As used herein control logic 202 provides the logical interface between the enhanced network interface 202 and a host computing/network device. In this regard, control logic 202 manages one or more aspects of ENI 108 to provide a communication interface from a host computing/network device to computing elements resident on communicatively coupled network(s). According to one aspect of the present invention, control logic 202 receives initialization event indications such as, e.g., an interrupt, from a host computing/networking device denoting any of a number of possible initialization event(s). Upon receiving such an indication, control logic 202 selectively invokes the resource(s) of security agent 110 to (re)establish communications with one or more remote manageability devices. As introduced above, security agent 110 selectively invokes an instance of the authentication services 212 utilizing the innovative anti-replay exchange (ARE) protocol to authenticate the remote computing device, and to establish a baseline anti-replay value from which to facilitate secure communications. As used herein, control logic 202 is intended to represent any of a wide variety of control logic known in the art and, as such, may well be implemented as a microprocessor, a microcontroller, a field-programmable gate array (FPGA), application specific integrated circuit (ASIC), programmable logic device (PLD) and the like. In alternate implementations, control logic 202 is intended to represent content (e.g., software instructions, etc.), which when executed implements the features of control logic 202 described herein.

Memory 204 is intended to represent any of a wide variety of memory devices and/or systems known in the art. According to one example implementation, memory 204 may well include volatile and non-volatile memory elements. In accordance with one aspect of the present invention, memory 204 includes non-volatile memory element(s) used to maintain manageability information. According to one example implementation, the non-volatile memory elements are comprised of electronically erasable programmable read-only memory (EEPROM) element(s) (not specifically denoted). A graphical illustration of an example memory 204 is presented with reference to FIG. 3, below.

Figure 3:
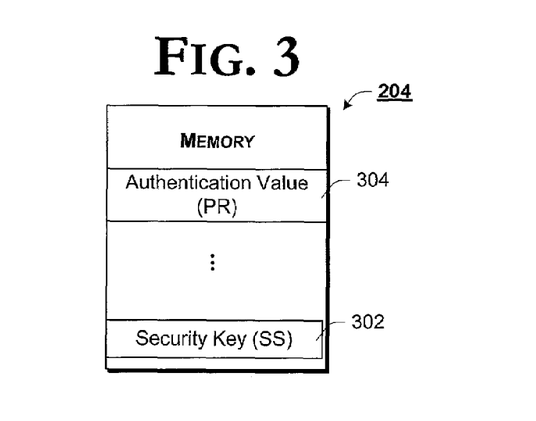
FIG. 3 is a graphical illustration of an example data structure used in accordance with the secure communications interface, according to one example implementation of the invention.

Turning briefly to FIG. 3, a graphical illustration of an example data structure suitable for use in accordance with the authentication and secured manageability communication features of ENI 108 is generally presented. In accordance with the illustrated example embodiment of FIG. 3, a memory 204 is endowed with a data structure comprising one or more of a security key (or, shared secret (SS)) 302 and an authentication value (PR). In accordance with the illustrated example implementation, the security key (SS) is a secret shared between the client 102 (or, the ENI 108) and the manageability server 104, while the authentication value is a pseudo-random number generated by authentication services 212 on ENI 108. As introduced above, security agent 110 selectively accesses such elements of the data structure to facilitate secure manageability communications with manageability services 112.

Those skilled in the art will appreciate that since the authentication value is established by and maintained within the ENI 108, it is available independently of a functional operating system executing on the host client 102. Moreover, in as much as this value is typically generated and saved to memory 204 only once per-initialization event, it does not serve to prematurely age the physical components of memory 204 as may other, conventional, approaches to authentication.

Returning to FIG. 2, ENI 108 is depicted comprising network communication resource(s) 206. As used herein, network communication resource(s) 206 provide the communication resources through which ENI 108 interacts with remote device(s) via a communicatively coupled communication medium, e.g., network 106. In this regard, network communication resource(s) 206 may well include resources to couple ENI 108 with any of a number of data network architectures, wireless communication architectures, and the like.

Application(s) 208 are intended to represent an optional feature set of ENI 108, i.e., the innovative aspects of ENI 108 may well be practiced without the need of such application(s) 208. Nonetheless, in certain implementations it may be advantageous for ENI 108 to include, for example, a user interface, management tools, key management/exchange application(s) or protocol(s) and the like for use by, for example, an administrator of a host computing device. In this regard, application(s) 208 are intended to represent any of a wide variety of application(s) used to monitor and/or control one or more features of ENI 108 and/or a host computing device.

As introduced above, security agent 110 is selectively invoked by control logic 202 to authenticate a remote computing device utilizing ARE protocol resources and establish a baseline sequence value to facilitate subsequent communications in general, and secure manageability communications in particular, between the ENI 108 and one or more manageability computing device(s) 104. In accordance with the illustrated example implementation of FIG. 2, security agent 110 is depicted comprising one or more of authentication services 212, secure communication services 214 and cryptography services 216. Although depicted as a number of disparate elements, those skilled in the art will appreciate that one or more elements 212-216 of security agent 110 may well be combined without deviating from the scope and spirit of the present invention.

In either implementation, upon an initial boot of computing system 102, security agent 110 identifies whether a security key is available from memory 204 or, from a memory resource of host computing system 102. If the security key is not resident within ENI 108, or available from host computing system 102, the key management service(s)/protocol(s) of the host computing system are invoked to acquire a security key. As above, any of a number of methods and/or protocols may well be employed to acquire and manage a security key, which is then maintained in memory 204. Once a security key is established, key management services of the host may periodically update the security key, in accordance with the particular method/protocol.

As introduced above, authentication services 212 includes an innovative authentication protocol, i.e., the anti-replay exchange (ARE) protocol. The authentication protocol of authentication services 212 is selectively invoked upon detection of an initialization event in a host computing system (e.g., 102) and/or in ENI 108, to communicate with a remote computing device, similarly endowed with at least the innovative authentication protocol (typically, a manageability server). As introduced above, the authentication protocol (ARE) is employed to authenticate the manageability server to the security agent 110, as well as to establish a baseline sequence value (anti-replay mechanism), used by, for example, the security communication protocol of secured communication services 214.

Once the base sequence value is generated, secure communication between the ENI 108 and, e.g., the manageability service(s) 112 may well continue using any of a number of secure networking protocols. In this regard, ENI 108 is depicted comprising secure communication service(s) 214 to facilitate such secure communication. As used herein, secure communication service(s) may well employ any of a number of secure communication protocols such as, e.g., the secure Internet protocol(s) (IPSec, IPv6, etc.) and the like. According to one example implementation, once the baseline sequence value is established using the innovative anti-replay exchange (ARE) protocol, the communication resources of secure communication services 214 (e.g., IPSec) are engaged to protect against replay attacks, in accordance with the IPSec protocol. More particularly, In accordance with the IPSec implementation, the anti-replay value is an incremental sequence value field of the encapsulating security payload (ESP) header of the IPSec datagram (see, e.g., FIG. 6).

As introduced above, the cryptography services 216 provide security agent 110 with the ability to encrypt/decrypt elements of the secure communication in accordance with any of a wide variety of known and proprietary cryptography functions. In this regard, cryptography services 216 may well use Data Encryption Standard (DES) compliant cryptography functions such as, e.g., DES, 3-DES, and the like.

Figure 4:
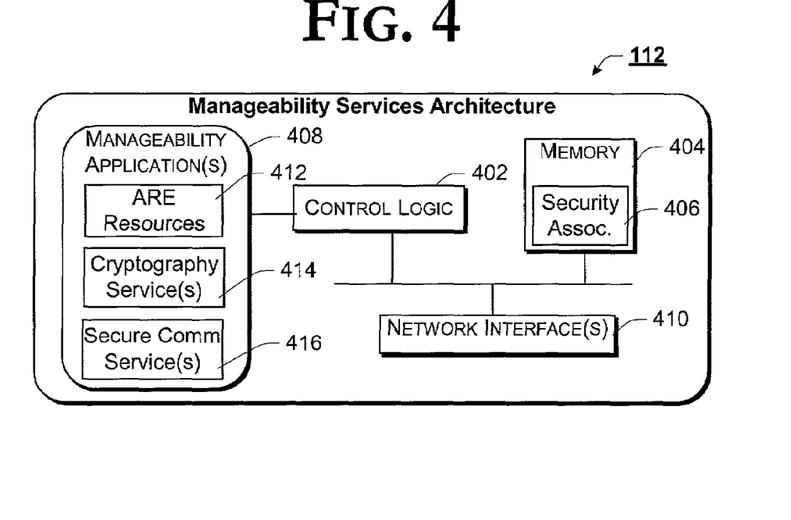
FIG. 4 is a block diagram of an example manageability services architecture, according to one aspect of the present invention.

Turning next to FIG. 4, a block diagram of an example architecture for manageability services 112 is presented, in accordance with but one example implementation. In accordance with the illustrated example implementation of FIG. 4, manageability services 112 is presented comprising control logic 402, memory 404 including security association (SA) information 406, one or more manageability tools 408 and network interface(s) 410, each logically coupled as depicted. In accordance with one aspect of the present invention, manageability applications 408 includes ARE protocol resources 412 and may well include one or more of cryptography services 414 and/or secure communication service(s) 416. In this regard, manageability services 112 is capable of interacting with the authentication services 212 of an ENI 108 using the innovative ARE protocol.

Control logic 402 controls the overall operation of manageability service(s) 112. In this regard, control logic 408 selectively invokes one or more manageability applications 408 and associated services (412, 414 and 416) to provide a user with a means through which a remote computing device may be monitored and/or controlled. As used herein, control logic 402 is intended to represent executable content (e.g., software) to implement the features of control logic 402 described herein. In alternate implementations, control logic 402 may well be implemented in hardware on, e.g., a network interface device, etc.

Memory 404 is intended to represent any of a wide variety of memory devices and/or systems known in the art. According to one example implementation, memory 404 represents the memory system of a host computing system (e.g., 104) implementing the manageability service(s) 112. Memory is depicted within the architecture of FIG. 4 to denote the relationship between the security association data structure 406 and the manageability services architecture. The security association data structure is established and maintained by control logic 402, and may comprise a number of entries denoting security and manageability information associated with any of a number of remote (client) computing devices under management. An example security associations data structure is presented with reference to FIG. 5.

Figure 5:
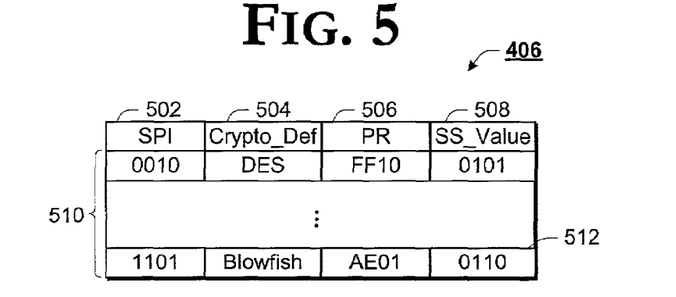
FIG. 5 is a graphical illustration of an example data structure used in accordance with the manageability services for maintaining security information, according to one example embodiment of the present invention.

Turning briefly to FIG. 5, a graphical illustration of an example data structure for managing security association information is presented, in accordance with one embodiment of the present invention. As introduced above, manageability services 112 may well perform manageability functions with multiple client(s) through one or more network(s). In this regard, a data structure of security association information is maintained for at least a subset of actively managed client computing device(s).

In accordance with the illustrated example implementation of FIG. 5, the security association data structure 406 is depicted comprising a security association identifier field 502, a cryptography definitions field 504, an authentication value field 506 and a security key field 508, as shown. In alternate implementations, security association data structure(s) of greater or lesser complexity may well be used without deviating from the teachings of the present invention.

As will be described in an operational context more fully below, the security association identifier field 502 denotes a particular identifier for each client and/or managed agent executing on a client. The cryptography definitions field 504 denotes the cryptography features (e.g., DES, Blowfish, RSA, etc.) employed to secure the communications between the manageability services and the client (or agent(s) within the client). The authentication value field 506 denotes the authentication value (PR) established between ENI 108 and manageability services 112. In accordance with the teachings of the present invention, when manageability services 112 is interfacing with an ENI 108, the authentication value in field 506 is merely updated once per client initialization event. The security key field 508 denotes the shared secret established between the client and the manageability services 112. In this regard, the security associations data structure 406 is employed to maintain security information for at least a subset of clients managed by manageability services 112.

Returning to FIG. 4, manageability services 112 is depicted comprising one or more manageability applications 408. According to one aspect of the present invention, manageability services 112 includes ARE protocol resources 412. According to one example implementation, such protocol resources 412 are selectively executable from within manageability applications 408. In alternate implementations, ARE protocol resources 412 may well be embodied as a protocol stack within, e.g., network interface(s) 410. In either implementation, ARE protocol resources 412 enable manageability services 112 to perform authentication services with ENI 108.

As used herein, manageability applications 408 are intended to represent any of a wide variety of application tools that enable a user to remotely manage one or more client computing device(s). In this regard, such applications 408 may well include a user-interface (not particularly denoted), cryptography services 414 and secure communication services 416. As above, the cryptography services (DES, Blowfish, RSA, etc.) perform encryption/decryption services on at least a subset of datagram(s) passed in the communication between the manageability services 112 and the client. Similarly, secure communication services 416 include a wide variety of secure communication resources (IPSec, etc.) to facilitate secure communication with a remote client computing device.

Network interface(s) 410 are intended to represent any of a wide variety of network communication resources known in the art, enabling manageability services 112 to interact with client computing devices through a wide variety of network topologies and architectures and, as such need not be further described herein.

EXAMPLE SECURE MANAGEABILITY DATAGRAM

As introduced above, once the manageability server 104 has been authenticated, ENI 108 and the manageability services 112 negotiate a baseline sequence value (anti-replay value). Once the baseline sequence value is established, the secure communication resources of, for example, the IPSec protocol may well be employed to secure subsequent communications, using the baseline sequence value as a starting point, from which the standard anti-replay features of the communications protocol can commence. An example of an IPSec datagram utilizing the features of the anti-replay value is presented with reference to FIG. 6, below.

Figure 6:
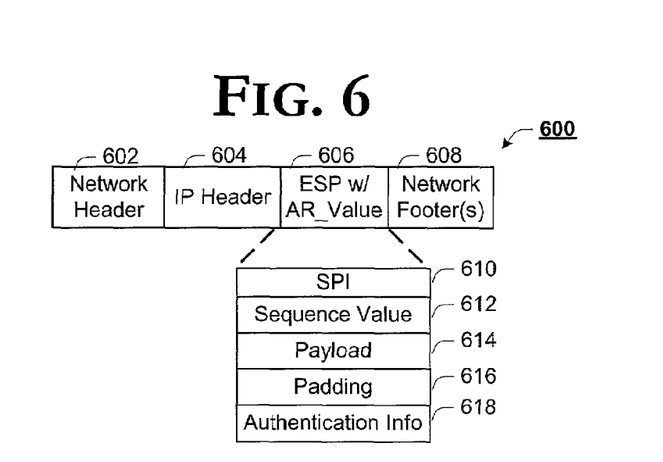
FIG. 6 is a graphical illustration of an example datagram used in accordance with the teachings of the present invention.

With reference to FIG. 6, a graphical illustration of an example IPSec datagram is presented, according to one embodiment of the present invention. In accordance with the illustrated example implementation of FIG. 6, the datagram 600 is depicted comprising a network header 602, an internet protocol (IP) header 604, a secure payload section 606 and, optionally, one or more network footers 608. In accordance with one example implementation, the payload is secured using an Encapsulating Security Payload (ESP) with anti-replay features. As depicted, the ESP section includes a number of fields 610-618 including a sequence value field 612. In accordance with one example implementation of the present invention, the baseline sequence value is employed as a starting point from which the incremental sequence values 612 are used for anti-replay purposes. The other fields include a security parameter index 610, the actual payload 614, security padding 616 and authentication information 618.

EXAMPLE OPERATION AND IMPLEMENTATION

Figure 7:
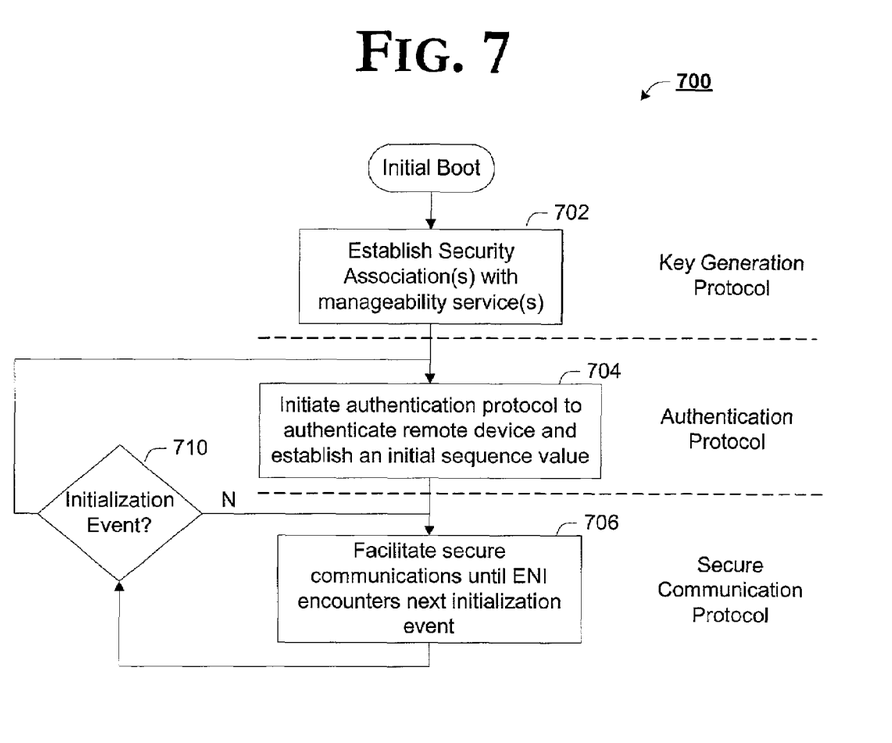
FIG. 7 is a flow chart of an example method for implementing secure manageability communications, in accordance with the teachings of the present invention.
Figure 8:
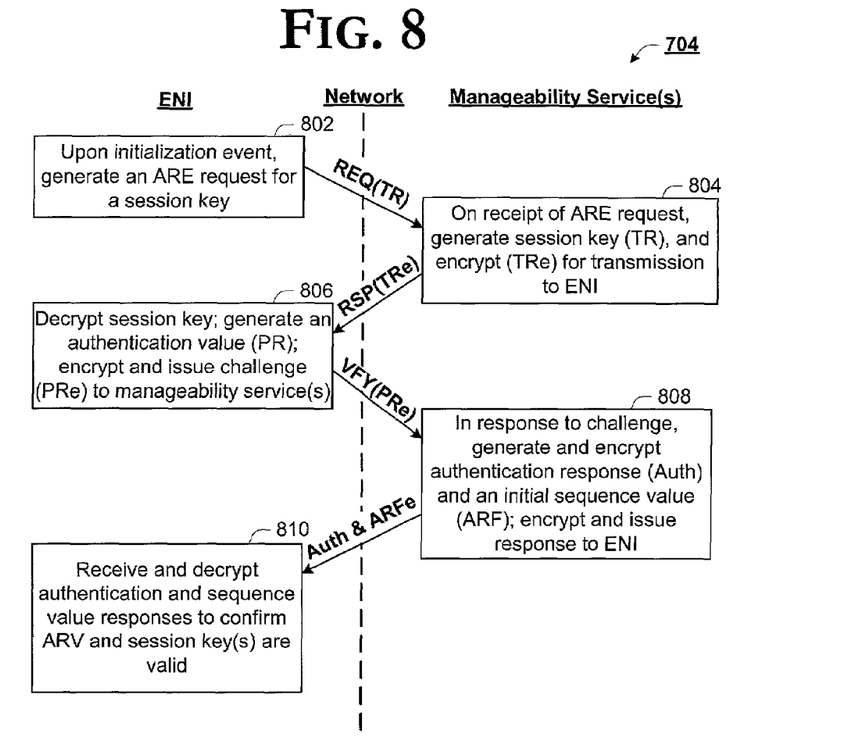
FIG. 8 is an example communication flow diagram for establishing an anti-replay value in accordance with the teachings of the present invention.

Having introduced the operating environment and architectural details of the present invention with reference to FIGS. 1-6, above, reference is now directed to FIGS. 7 and 8 wherein the operation of the secure manageability system is developed in greater detail. For ease of illustration, and not limitation, the operation of the secure manageability system will be developed with continued reference to FIGS. 1-6.

FIG. 7 is a flow chart of an example method for implementing secure manageability communications, in accordance with the teachings of the present invention. In accordance with the illustrated example implementation of FIG. 7, the method begins with block 702 where, in the absence of a prior interaction between the enhanced network interface (ENI) 108 and the manageability services 112, a security key (or, shared secret) (SS) is established between the host computing device 102 and the manageability services 112. According to one example implementation, host computer 102 employs one of a number of key exchange and management protocols such as, e.g., ISAKMP, to automatically establish and maintain the security key (shared secret) (SS) between the host computer 102 and the manageability computing device 104. In this regard, manageability services 112 begins to establish an entry associated with ENI 108 in its security associations data structure, storing the security key information. Similarly, computing device 102 stores a representation of the security key locally and, perhaps, within ENI 108 as discussed above. Those skilled in the art will appreciate, however, that the key exchange and management may well be performed manually by exchanging the security key between appropriate computing devices using, e.g., a removable storage media (floppy disk, CD, etc.), or it may be manually typed in from the memory of an administrator.

In block 704, in response to an initialization event, control logic 202 selectively invokes an instance of authentication services 212. As introduced above, authentication services 212 initiates an authentication protocol to identify and authenticate a remote manageability server. Once authenticated, authentication services 212 employs the authentication protocol (ARE) to negotiate a baseline sequence value with the remote manageability services. The baseline sequence value serving as a starting point anti-replay value to facilitate subsequent communications with anti-replay protection. A communication flow diagram depicting the details of an example negotiation process used to establish the baseline sequence value is presented in greater detail below, with reference to FIG. 8.

In block 706, ENI 108 facilitates secure manageability communications using the baseline sequence value established in block 704 as a starting point for the anti-replay features of the communications protocol (e.g., IPSec). In this regard, security agent 110 of ENI 108 selectively invokes an instance of secure communications services 214 to facilitate subsequent communications between ENI 108 and the manageability services 112 of the authenticated management server 104 until a subsequent initialization event is identified, in block 710.

If, in block 710, a subsequent initialization event is encountered, the process continues with block 704, as security agent 110 selectively invokes an instance of authentication services 212 to (re)authenticate a manageability server and establish a baseline sequence value from which to protect subsequent communications from replay attacks.

Turning to FIG. 8, an example communication flow diagram for authenticating a remote manageability device and establishing a baseline sequence value (block 704 of FIG. 7) is presented in accordance with the teachings of the present invention. In accordance with the illustrated example implementation of FIG. 8, the process 704 begins with block 802 at the ENI 108 where, upon receiving an indication of an initialization event, authentication services 212 generates and issues a request for a session key, e.g., REQ. In accordance with one example implementation, the ARE request is issued in plain text (e.g., not encrypted).

In block 804 at the manageability services 112, on receipt of the ARE request, manageability services generates a session key (TR), encrypts the session key and generates an ARE response (RSP) to the request. According to one implementation, the session key (TR) is a substantially random number generated by control logic 402. Control logic 402 then implements an appropriate one of cryptographic services 414 to encrypt the session key (TR) using the security key (SS). Mathematically, this encryption may be expressed as:

$$TRe = F_e(TR, SS) \tag{1}$$

where:
  TRe is the encrypted session key (TR);
  SS is the shared secret; and
  $F_e$ is the cryptographic function used to encrypt the session key.

Once the session key is encrypted (TRe), it is communicated to ENI 108 using an ARE response, e.g., RSP(TRe).

In block 806 at the ENI 108, upon receipt of the ARE response, authentication services 212 decrypts the encrypted session key (TRe), employing an appropriate one or more of cryptographic services 216 to recover the session key (TR). Mathematically, the decryption function may be expressed as:

$$TR = F_d(TRe, SS) \tag{2}$$

where:
  TRe is the encrypted session key (TR);
  SS is the shared secret; and
  $F_d$ is an appropriate cryptographic function used to decrypt the session key.

In addition to recovering the session key (TR), authentication services 212 generates an authentication value (PR).

According to one implementation, if this is the initial boot for ENI 108, authentication services 212 generates a pseudo-random number for use as the authentication value (PR). The authentication value (PR) is encrypted with the security key (SS) to generate an authentication value for use in a subsequent computing session (PRnext), i.e., after receipt of a subsequent initialization event. Accordingly, PRnext is stored in memory 204 as an authentication value (PR) for use in subsequent invocations of the authentication services 212. Mathematically, generation of PRnext may be expressed as:

$$PRnext = F_e(PR, SS) \quad (3)$$

where:
PRnext is the anti-replay value used for a subsequent computing session;
SS is the shared secret; and
$F_e$ is the cryptographic function used to encrypt the anti-replay value.

Once the authentication value (PR) is generated, authentication services 212 of security agent 110 encrypts the authentication value and issues an authentication challenge (e.g., VFY) to verify the legitimacy of the remote computing device. According to one example implementation, the authentication value is encrypted with the session key session key (TR) received from block 804 above. Mathematically, the encryption of the authentication value may be expressed as:

$$PRe = F_e(PR, TR) \quad (4)$$

where:
PRe is the encrypted anti-replay value PR;
TR is the session key; and
$F_e$ is the cryptographic function used to encrypt the anti-replay value.

In block 808, manageability services 112 receives the authentication challenge and decrypts the authentication value (PRe), as expressed in equation 5, below.

$$PR = F_d(PRe, TR) \quad (5)$$

where:
PRe is the encrypted anti-replay value PR;
TR is the session key; and
$F_d$ is the cryptographic function used to decrypt the anti-replay value.

Once decrypted, control logic 202 updates the security association data structure 406 with the authentication value information associated with ENI 108. In addition, control logic 202 generates and encrypts an authentication response and an encrypted baseline sequence value, each of which are expressed mathematically in equations 6 and 7, below.

$$Auth = F_e(TR, PR) \quad (6)$$

where:
Auth is the session key encrypted with the anti-replay value PR;
TR is the session key; and
$F_e$ is the cryptographic function used to encrypt the anti-replay value.

$$ARFe = F_e(ARF, TR) \quad (7)$$

where:
ARF is the baseline sequence value generated by, e.g., IPSec resources;
TR is the session key; and
hd e is the cryptographic function used to encrypt the anti-replay value.

As illustrated in equation 6, above, the authentication is generated using the original data as the key and the session key as the data of the authentication response (Auth). In equation 7, an encrypted baseline sequence value is generated by taking the IPSec anti-replay field and encrypting it using the session key (TR). This authentication response (AUTH) and encrypted baseline sequence values are communicated to the ENI 108, in accordance with the ARE communication protocol.

In block 810, authentication services 212 receives and decrypts the authentication response and the baseline sequence value received from manageability services 112. That is, authentication services 212 decrypts each of the AUTH and ARFe responses and checks the session key against prior responses to confirm that the responding computing device is a legitimate manageability server, before adopting the baseline sequence value as a legitimate sequence value for use as a starting point for protection against replay attacks. Mathematically, such decryption may well be expressed as:

$$TR = F_d(AUTH, PR) \quad (8)$$

where:
Auth is the session key encrypted with the anti-replay value PR;
TR is the session key; and
$F_d$ is the cryptographic function used to decrypt the Authentication value.

$$ARF = F_d(ARFe, TR) \quad (9)$$

where:
ARF is the anti-replay field;
TR is the session key; and
$F_d$ is the cryptographic function used to decrypt the anti-replay field.

According to certain implementations, ENI 108 may well issue a confirmation of successful authentication to the remote manageability services 112.

EXAMPLE COMPUTING DEVICE ARCHITECTURE

Figure 9:
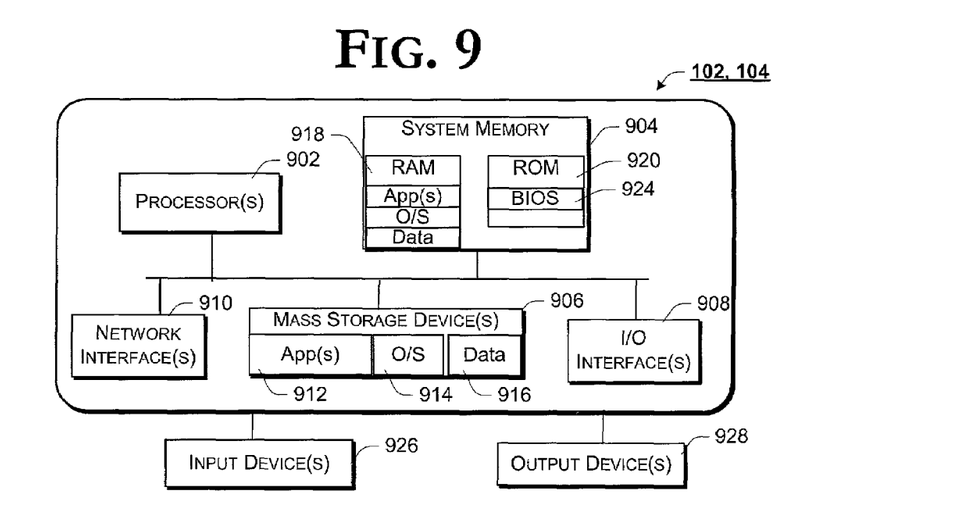
FIG. 9 is a block diagram of an example computing device suitable for implementing one or both of the enhanced network interface and/or the manageability services of the present invention.

FIG. 9 is a block diagram of an example computing device suitable for use as a computing device in a secure manageability system introduced herein. It is to be appreciated that computing device 900 is only one example of a suitable computing environment and is not intended to suggest any limitation as to the scope of use or functionality of the media processing system. Neither should the computing device 900 be interpreted as having any dependency or requirement relating to any one or combination of components illustrated in the exemplary computing device 900.

The secure manageability system introduced above is operational with numerous other general purpose or special purpose computing system environments or configurations. Examples of well known computing systems, environments, and/or configurations that may be suitable for use with the secure manageability system include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

In certain implementations, aspects of the system, protocol and related methods for providing secure manageability may well be described in the general context of computer-executable instructions, such as program modules, being executed by a computer. Generally, program modules include routines, programs, objects, components, data structures, etc. that perform particular tasks or implement particular abstract data types. The media processing system may also be practiced in distributed computing environments where tasks are performed by remote processing devices that are linked through a communications network. In a distributed computing environment, program modules may be located in both local and remote computer storage media including memory storage devices.

In accordance with the illustrated example embodiment of FIG. 9 computing system 200 is shown comprising one or more processors or processing units 902, a system memory 904, and a bus that couples various system components including the system memory 904 to the processor 902.

The bus is intended to represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) buss also known as Mezzanine bus.

Computing device 900 typically includes a variety of computer readable media. Such media may be any available media that is locally and/or remotely accessible by computer 900, and it includes both volatile and non-volatile media, removable and non-removable media.

In FIG. 9, the system memory 904 includes computer readable media in the form of volatile, such as random access memory (RAM) 918, and/or non-volatile memory, such as read only memory (ROM) 920. A basic input/output system (BIOS) 924, containing the basic routines that help to transfer information between elements within computer 900, such as during start-up, is stored in ROM 920. RAM 918 typically contains data and/or program modules that are immediately accessible to and/or presently be operated on by processing unit(s) 902.

Computer 200 may further include other removable/non-removable, volatile/non-volatile computer storage media. By way of example only, FIG. 9 illustrates mass storage device(s) 906 for reading from and writing to a non-removable, non-volatile magnetic media (not shown and typically called a "hard drive"). Examples of such media include a magnetic disk drive for reading from and writing to a removable, non-volatile magnetic disk (e.g., a "floppy disk"), an optical disk drive for reading from or writing to a removable, and a non-volatile optical disk such as a CD-ROM, DVD-ROM or other optical media. The mass storage device(s) are depicted coupled with other system elements via one or more bus(ses).

The drives and their associated computer-readable media provide nonvolatile storage of computer readable instructions, data structures, program modules, and other data for computer 900. Although the exemplary environment described herein employs magnetic media, it should be appreciated by those skilled in the art that other types of computer readable media which can store data that is accessible by a computer, such as cassettes, flash memory cards, digital video disks, random access memories (RAMs), read only memories (ROM), and the like, may also be used in the exemplary operating environment.

A number of program modules may be stored on the mass storage device(s) 906 including, by way of example and not limitation, an operating system 914, one or more application programs 912 (e.g., manageability service(s), ARE protocol stack, crypto functions, secure communication services, and the like), and program data 916.

Continuing with FIG. 9, a user may interface with computer 900 through input devices 926 such as keyboard and pointing device (such as a "mouse"). Other input devices may include an audio/video input device(s), a microphone, joystick, game pad, satellite dish, serial port, scanner, or the like (not shown). These and other input devices are connected to the processing unit(s) 902 through input interface(s) that is(are) coupled to any of a number of interface and bus structures, such as a parallel port, game port, or a universal serial bus (USB). 100761 In addition to input device(s) 926, computing device 900 is also depicted comprising output device(s) 928. Such output device(s) are communicatively coupled with other system 900 elements through an interface(s) to one or more appropriate bus structure(s). Examples of such output device(s) include, for example, a monitor or other type of display device coupled to an appropriate bus via an interface, such as a video adapter. In addition to the monitor, personal computers typically include other peripheral output devices (not shown), such as speakers and printers, which may be connected through an output peripheral interface.

Computer 900 may operate in a networked environment using logical connections to one or more remote computers through network interface(s) 910. In accordance with one aspect of the present invention, network interface(s) 910 may well include the enhanced network interface 108, providing computing device 900 with the secure manageability communication features described herein. The communicatively coupled, remote computer may include many or all of the elements and features described herein relative to computer 900 including, for example, the enhanced network interface 108 of network interface(s) 910, manageability service(s) 112 of application(s) 912, and the like.

In addition to the ENI 108, network interface(s) 910 may also be endowed with the communication resources and physical interface(s) necessary to interface computing device 900 with one or more of a local area network (LAN), and a general wide area network (WAN). Such networking environments are commonplace in offices, enterprise-wide computer networks, intranets, and the Internet. In a networked environment, program modules depicted relative to the computing device 900, or portions thereof, may be stored in a remote memory storage device communicatively coupled with the computing device 900 through a network and an associated network interface 910.

Alternate Embodiment(s)

Figure 10:
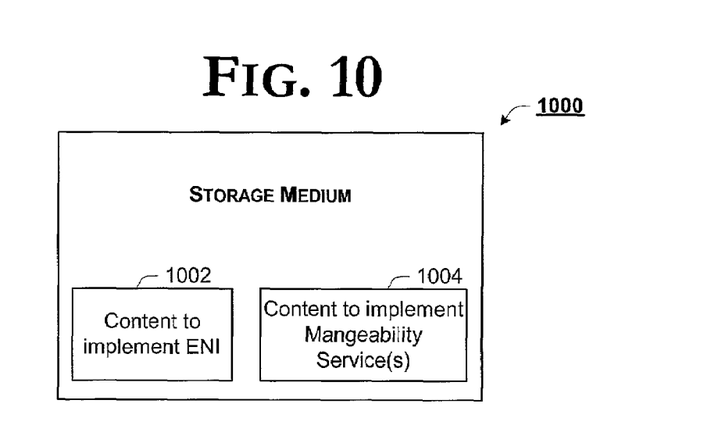
FIG. 10 is a block diagram of an example storage medium comprising a plurality of executable instructions which, when executed, cause an accessing machine to implement one or more aspects of the innovative communication agent of the present invention, in accordance with an alternate embodiment of the present invention.

FIG. 10 is a block diagram of an example storage medium comprising a plurality of executable instructions which, when executed, cause an accessing machine to implement one or more aspects of the innovative enhanced network interface 108 and/or manageability services 112 of the present invention, in accordance with an alternate embodiment of the present invention.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 1-5, or may be embodied in machine-executable instructions, which may be used to cause a general-purpose or special-purpose processor or logic circuits programmed with the instructions to perform the steps. Alternatively, the steps may be performed by a combination of hardware and software. Moreover, although the invention has been described in the context of a network interface card, those skilled in the art will appreciate that such functionality may well be embodied in any of number of alternate embodiments such as, for example, integrated within a computing device, and is readily adaptable to wireless Ethernet implementations as well as the wired environment described herein.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A system comprising:
a host system coupled with a remote system via a communications link, wherein the host system includes an enhanced network interface, the enhanced network interface including control logic to enable authentication of the remote system when the host system does not have a functional operating system, the enhanced network interface including a memory to hold authentication and security data;
wherein the enhanced network interface implements:
an authentication protocol responsive to an initialization event in the host system, the authentication protocol to facilitate authentication of the remote system and establish an initial anti-replay value, and
a secure communication protocol selectively invoked upon authentication of the remote system, the secure communication protocol to secure subsequent communications from replay attack utilizing the initial anti-replay value in at least a first of said subsequent communications.

2. The system of claim 1, wherein the enhanced network interface further comprises a key management and exchange prtocol coupled with the authentication protocol and the secure communication protocol, to negotiate and communicate a security key between the host system and the remote system for use in authentication of the remote system to the host system, the security key being stored in the memory of the enhanced network interface.

3. The system of claim 2, wherein the enhanced network interface establishes an authentication value, stores the authentication value in the memory of the enhanced network interface, and securely issues an authentication challenge to the remote system using the authentication value according to the authentication protocol.

4. The system of claim 3, wherein the authentication value comprises a pseudo-random value.

5. The system of claim 4, wherein the authentication value is secured for communication to the remote system by the enhanced network interface by encrypting the pseudo-random value with the security key using an encryption function.

6. The system of claim 5, wherein the encryption function employed comprises one or more of a Data Encryption Standard (DES) cryptographic function, a 3-DES cryptographic function, and an RSA cryptographic function.

7. The system of claim 5, wherein the remote system responds to the authentication request by encrypting a session key with the authentication value using the encryption function.

8. The system of claim 5, wherein the remote system responds to the authentication request by issuing the initial anti-replay value via the authentication protocol.

9. The system of claim 8, wherein the baseline anti-replay value is employed by secured communication services of the enhanced network interface to facilitate subsequent communications with the remote system to protect against replay attacks on such communication by another system.

10. The system of claim 5, wherein a security agent of the enhanced network interface determines whether the security key is available from the memory or from a memory resource of the host system, and, if not, the security agent invokes key management services to attempt to obtain the security key from the host system.

11. The system of claim 1, the authentication protocol comprising a request feature, issued by the enhanced network interface to the remote system, to initiate an authentication of the remote system to the host system.

12. The system of claim 11, the authentication protocol further comprising a response feature, issued by the remote system to the host system via the enhanced network interface, to communicate a session key to the host system.

13. The system of claim 12, wherein the session key is encrypted using a security key that is known to the enhanced network interface for the host system and to the remote system, the encryption being performed using a cryptographic function.

14. The system of claim 12, the authentication protocol further comprising an authentication challenge feature, issued by the enhanced network interface for the host system to the remote system, in which an authentication value is passed to the remote system, and wherein the remote system must properly respond to the authentication challenge in order to be authenticated.

15. The system of claim 14, wherein the authentication value includes a pseudo-random value element encrypted with the session key using a cryptographic function.

16. The system of claim 14, the authentication protocol comprising an authentication response feature, issued by the remote system to the host system via the enhanced network interface, in which the session key is encrypted in accordance with a cryptographic function by the authentication value, recovered by the remote system by decrypting the authentication challenge.

17. The system of claim 16, wherein the remote system is successfully authenticated by the enhanced network interface for the host system if decryption of the authentication response accurately reveals the session key.

18. A method comprising:
receiving an indication of an initialization event in a host system; and
invoking an authentication protocol at an enhanced network interface to authenticate a remote system to the host system in order to establish a baseline anti-replay value with which to secure subsequent communications between the remote system and the host system from replay attack; and
enabling the remote system to manage the host system using the enhanced network interface without the host system having a functional operating system, the network interface including control logic to operate independently when the operating system of the host system is not functional, the network interface including a memory to hold authentication and security data.

19. The method of claim 18, wherein authenticating the remote system comprises:
issuing a request from the enhanced network interface to the remote system initiating authentication; and
receiving at the enhanced network interface a response to the request from the remote system, the response including a session key encrypted with a security key using a cryptographic function.

20. The method of claim 19, wherein issuing the request from the enhanced network interface comprises broadcasting a request from the enhanced network interface to a network comprising one or more remote systems.

21. The method of claim 20, further comprising identifying a target remote system from the one or more remote devices systems as the remote system that shares a security key with the enhanced network interface for the host system, facilitating decryption of the response.

22. The method of claim 19, further comprising:
generating an authentication value enhanced network interface; and
issuing an authentication challenge from the enhanced network interface to the remote system, the authentication challenge comprising the authentication value encrypted with the session key using a cryptographic function.

23. The method of claim 22, further comprising receiving an authentication response from the remote system, the authentication response comprising the session key encrypted in accordance with a cryptographic function with the authentication value, recovered by the remote system by decrypting the authentication challenge with using the session key to reveal the authentication value.

24. The method of claim 23, further comprising:
decrypting the authentication response using the authentication value; and
determining whether the decryption reveals the session key, wherein successful decryption of the session key authenticates the remote system to the enhanced network interface for the host system.

25. The method of claim 24, further comprising selectively invoking secured communication services at the enhanced network interface to facilitate at least secure manageability communications with the remote system upon successful authentication of the remote system to the enhanced network interface for the host system.

26. The method of claim 23, wherein the authentication response includes a baseline anti-replay value.

27. The method of claim 26, wherein the baseline anti-replay value comprises a sequence value.

28. The method of claim 26, wherein the baseline anti-replay value is employed by secured communication services of the enhanced network interface to facilitate subsequent communications with the remote system to protect against replay attacks on such communication by another system.

29. An apparatus comprising:
an enhanced network interface to enable a remote system to manage a host system via a communication link without the host system having a functional operating system, the network interface including:
control logic to operate independently if the host system operating system is not functional, the network interface to receive an indication of an initialization event from a host system;
a security agent, responsive to the control logic, to selectively invoke an instance of authentication services to authenticate a remote system to the enhanced network interface in order to establish a baseline anti-replay value with which to secure subsequent communication between the remote system and the interface from replay attack.

30. The apparatus of claim 29, the authentication services comprising an authentication prtocol to facilitate authentication communications between the enhanced network interface and the remote system until authentication of the remote system.

31. The apparatus of claim 30, the enhanced network interface comprising secure communication services, responsive to the control logic, the secure communication services utilizing a secure communication protocol to facilitate communication between the enhanced network interface and an authenticated remote system.

32. The apparatus of claim 30, wherein the authentication services receives a response to the request in accordance with the authentication protocol, the response including a session key encrypted with a security key using a cryptographic function.

33. The apparatus of claim 32, wherein the authentication services generates an authentication value, and issues an authentication challenge comprising an encrypted authentication value to the remote device using the authentication protocol.

34. The apparatus of claim 33, wherein the authentication value comprises a pseudo-random number element.

35. The apparatus of claim 34, wherein authentication services issues an authentication challenge in accordance with the authentication protocol, the authentication challenge including the authentication value encrypted with the session key utilizing a cryptographic function.

36. The apparatus of claim 35, wherein the authentication services receives an authentication response from the remote device in accordance with the authentication protocol, the authentication response including the session key encrypted by the authentication value obtained by the remote device through successful decryption of the encrypted authentication value.

37. The apparatus of claim 35, wherein the authentication services receives an initial anti-replay value from the remote device, the initial anti-replay value being used by the enhanced network interface to secure at least a first of one or more subsequent communications from replay attacks upon authentication of the remote device.

38. A computer-readable medium having stored thereon data representing sets of instructions that, when executed by a processor, cause the processor to perform operations comprising:
   receiving an indication of an initialization event in a host system;
   invoking an authentication prtocol in an enhanced network interface to authenticate a remote system to the host system in order to establish a baseline anti-replay value with which to secure subsequent communications between the remote system and the host system from replay attack; and
   enabling management of the host system using the enhanced network interface; the network interface is to operate independently using a control logic if the host system is without a functional operating system.

39. The medium of claim 38, wherein the sets of instructions, when executed, further cause the processor to perform operations comprising:
   issuing a request to initiate authentication of the remote system upon detecting the initialization event in the host system.

40. The medium of claim 39, wherein the sets of instructions, when executed, further cause the processor to perform operations comprising:
   receiving a response to the request in accordance with the authentication protocol, the response including a session key generated by the remote system and encrypted with a security key using a cryptographic function.

41. The medium of claim 40, wherein the sets of instructions, when executed, further cause the processor to perform operations comprising:
   generating an authentication value.

42. The medium of claim 41, wherein the sets of instructions, when executed, further cause the processor to perform operations comprising:
   implementing a pseudo-random value that is employed by authentication services as the authentication value.

43. The medium of claim 42, wherein the sets of instructions, when executed, further cause the machine to issue processor to perform operations comprising:
   issuing an authentication challenge in accordance with the authentication protocol, the authentication challenge including the authentication value encrypted with the session key utilizing a cryptographic function.

44. The medium of claim 43, wherein the sets of instructions, when executed, further cause the processor to perform operations comprising:
   receiving an authentication response from the remote system in accordance with the authentication protocol, the authentication response including the session key encrypted by the authentication value obtained by the remote system through successful decryption of the encrypted authentication value.

45. The medium of claim 44, wherein the sets of instructions, when executed, further cause the processor to perform operations comprising
   receiving an initial anti-replay value from the remote system, the initial replay value being used by the interface to secure at least a first of subsequent communications from replay attacks upon authentication of the remote system.

* * * * *

UNITED STATES PATENT AND TRADEMARK OFFICE
CERTIFICATE OF CORRECTION

PATENT NO.       : 7,370,111 B2                                    Page 1 of 1
APPLICATION NO.  : 10/113812
DATED            : May 6, 2008
INVENTOR(S)      : Callum

It is certified that error appears in the above-identified patent and that said Letters Patent is hereby corrected as shown below:

In column 6, at line 22, delete "filly" and insert --fully--.

In column 20, at line 34, delete "prtocol" and insert --protocol--.

Signed and Sealed this

Eighteenth Day of November, 2008

JON W. DUDAS
*Director of the United States Patent and Trademark Office*